United States Patent [19]
Colovas et al.

[11] 3,733,446
[45] May 15, 1973

[54] GUIDED VEHICLE POWER SUPPLY SYSTEM

[75] Inventors: Denny D. Colovas; John S. Logan; Richard R. Skruch, all of Dearborn, Mich.

[73] Assignee: Ford Motor Company, Dearborn, Mich.

[22] Filed: June 14, 1971

[21] Appl. No.: 152,641

[52] U.S. Cl. ................................191/49, 191/59.1
[51] Int. Cl. .................................................B60l 5/08
[58] Field of Search......................191/22, 23, 29, 30, 191/32, 33, 45, 48, 49, 50, 59.1

[56] References Cited
UNITED STATES PATENTS

| | | | |
|---|---|---|---|
| 692,817 | 2/1902 | Bergin | 191/48 |
| 610,007 | 8/1898 | Walkins | 191/49 |
| 772,282 | 10/1904 | Leonard | 191/49 |
| 3,345,471 | 10/1967 | Kilburg | 191/45 R |
| 3,405,240 | 10/1968 | Kilburg | 191/45 R |

Primary Examiner—Gerald M. Forlenza
Assistant Examiner—D. W. Keen
Attorney—John R. Faulkner et al.

[57] ABSTRACT

A power supply system for a vehicle which is guided along a predetermined path is disclosed. The power supply system has the following makeup. A power supply structure for supplying power to the guided vehicle is located along the side of the predetermined vehicle path. An aligning structure, associated with the power supply structure, provides a guide surface. An aligning wheel is rotatably secured by first support structure to the vehicle in such a position that the wheel contacts the guide surface of the aligning structure to guide the vehicle as it passes along the predetermined path. A plurality of current collectors, for engaging the power supply structure, are secured by second support structure to the first support structure in a position adjacent the aligning wheel. This second support structure resiliently supports the plurality of current collectors in engagement with the power supply structure.

3 Claims, 4 Drawing Figures

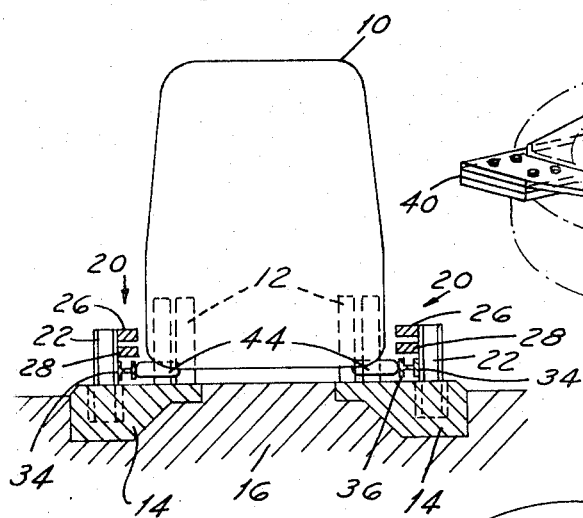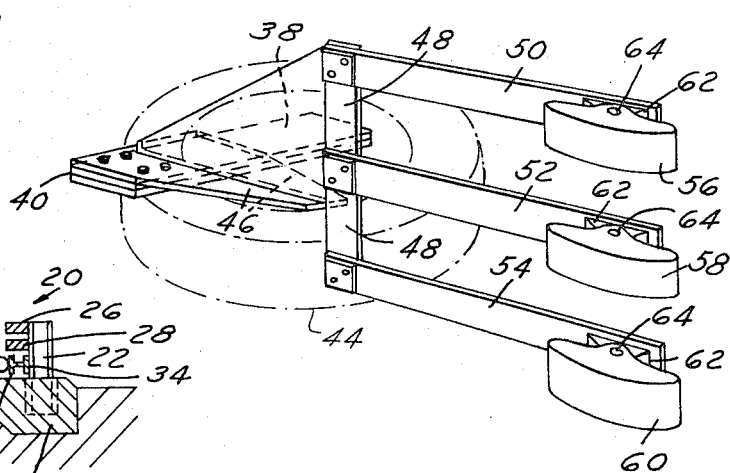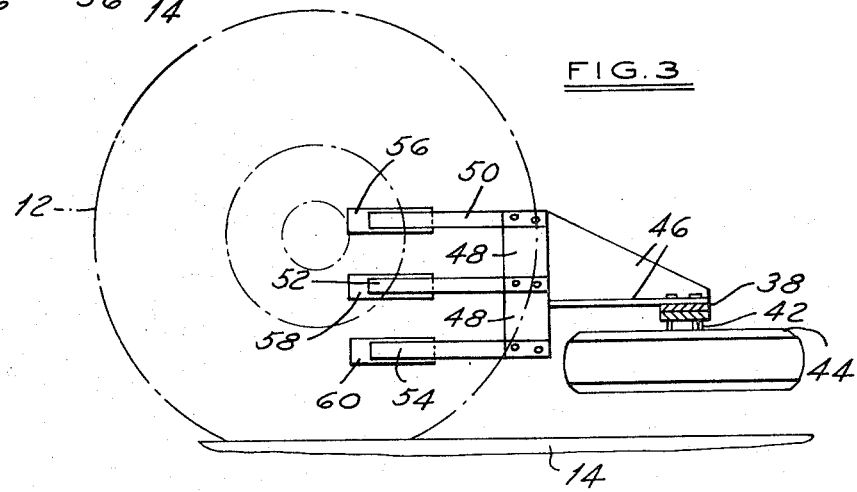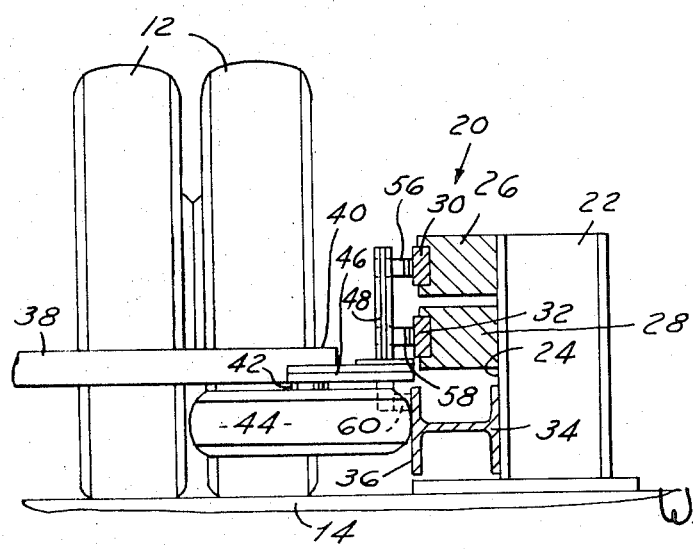

GUIDED VEHICLE POWER SUPPLY SYSTEM

BACKGROUND OF THE INVENTION

Many prior art systems have been developed for supplying power to vehicles. Power supply systems for subways and other electrically driven vehicles have been known in the art for many years. Also, many supply systems are known for supplying electrical energy to pneumatic tired vehicles guided over a predetermined path.

This invention is directed to the field of structures for providing electric power to guided vehicles. In particular, the invention is directed to structures for supplying electrical power to a pneumatic tired vehicle which is guided over a roadway. The inventive power supply system is so constructed that the current collector elements are positioned in engagement with the power supply structure and guided therealong by means of an aligning wheel which also serves to guide and to position the vehicle in its passage along the roadway.

SUMMARY OF THE INVENTION

This invention relates to a power supply system for a vehicle and, more particularly, to a power supply system for a vehicle which is guided along a predetermined path. In general, the invention is most useful in supplying power to a pneumatic tired vehicle guided along a predetermined path.

In accordance with the teachings of this invention, the power supply system contains the following general elements. A power supply structure is located along the side of the predetermined vehicle path for supplying power to the guided vehicle. A vehicle aligning structure is associated with the power supply structure to provide a guide surface along which the vehicle may be guided. First structure secures an aligning wheel to the vehicle in such a position that the wheel contacts the guide surface of the aligning structure. The aligning wheel is rotatable and it moves along the guide surface to guide the vehicle as it proceeds along the predetermined path. A second structure secures a plurality of current collectors to the first structure in a position adjacent the aligning wheel. The second structure resiliently supports the current collectors in engagement with the power supply structure. The second structure also locates the current collectors with respect to the aligning wheel so that the aligning wheel positions the collectors in association with the power supply structure.

In greater detail, the power supply structure includes support structure mounted along the predetermined path of the vehicle. The support structure has a surface facing inwardly toward the vehicle path and this surface has first and second insulating members secured thereto. First and second conductor elements are mounted along respective portions of the first and second insulating members facing inwardly toward the vehicle path.

In still greater detail, the aligning structure is preferably formed by a third conductor element secured to the support structure and providing a relatively smooth surface facing inwardly toward the vehicle path. The aligning structure, in its preferred embodiment, also serves as a portion of the power supply structure. The aligning structure may, in this preferred form be an "I" beam having its top surface facing inwardly toward the vehicle path. In such a case, the "I" beam serves as the ground conductor for the power supply as an associated one of the current collectors is brought into engagement therewith.

BRIEF DESCRIPTION OF THE DRAWINGS

FIG. 1 is an elevation view of a guided vehicle moving along a predetermined path. The vehicle employs a power supply system constructed in accordance with the teachings of this invention.

FIG. 2 is an elevation view, partly in cross section, showing the power supply system of this invention in greater detail.

FIG. 3 is a side elevation view of the system of FIG. 2. This view is taken in a direction looking toward the power supply structure of the system.

FIG. 4 is a perspective view showing the details of the portion of the power supply system associated with the vehicle. This view is taken in a direction looking away from the power supply structure of the system.

DESCRIPTION OF THE PREFERRED EMBODIMENT

In FIG. 1 there is seen a vehicle 10 which is supported on a plurality of pneumatic tires 12—12 for movement along a predetermined path. The bottom right and left edges of the predetermined path are defined by a pair of road bed elements 14—14 which may be formed from concrete and buried in a suitable surface 16.

The power supply system of this invention is shown in the drawings and generally identified by the numeral 20. The power supply system is, in part, associated with the road bed elements 14—14 and, in part, with the vehicle 10. As shown best in FIG. 1, the power supply structure is formed on both sides of the vehicle. It should be kept in mind that the power supply system may have vehicle portions mounted not only at both sides of the vehicle but also at both ends of the vehicle. Since each of the structures mounted on the vehicle is substantially identical, only one such structure will be discussed in detail.

A support structure 22 forms a portion of the general power supply system 20 associated with the road bed elements 14—14. The support structure extends upwardly from an associated road bed element and lengthwise along the entire predetermined path over which the vehicle 10 is guided. The support structure has a front surface 24 (FIG. 2) which faces inwardly toward the vehicle as the vehicle passes thereby. First and second insulating members 26 and 28 are secured to the front surface of the support structure. First and second conductor elements, 30 and 32 respectively, are mounted along the portions of first and second insulating members which face inwardly toward the predetermined vehicle path. A third conductor element 34 is also secured to the front surface of the support structure and positioned below the first and second insulating members. This third conductor element is in the form of a steel "I" beam. The third conductor provides a relatively smooth surface 36 facing inwardly toward the predetermined vehicle path. The conductor elements 30 and 32 are connected to a power signal in a known manner while the conductor element 34 is connected to ground potential. This arrangement of conductors permits a delta grounded power system for the vehicle.

A first support structure element 38 is secured to the under carriage of the vehicle 10 in a fixed position (not shown). A free end 40 of the first support structure element has a rotatable support structure 42 thereon. An aligning wheel 44 is attached to the rotatable support structure in such a horizontal position that the aligning wheel engages the inwardly facing surface 36 of the third conductor element 34. One function of the aligning wheel is to guide the vehicle along its predetermined path by positioning the vehicle properly within the path.

A second support structure element 46 extends from the free end 40 of the first support structure element 38 along the length of the side of the vehicle 10 a direction opposed to the direction of travel of the vehicle. This second support structure element 46 has both a vertical portion and a horizontal portion. The free end of the vertical portion of this second support structure carries an electrical insulating member 48.

Three spring arms 50, 52 and 54 each have one end thereof attached to the insulating member 48. The spring arms extend along the length of the track against the direction of movement of the vehicle 10. Also, these spring arms are normally biased in a direction toward the support structure 22 adjacent the predetermined path.

Individual collector brushes 56, 58 and 60 are respectively secured to the free ends of the three spring arms 50, 52 and 54. A raised portion 62 on each arm and a pivot pin 64 are utilized in each case to secure the collector brushes to individual ones of the spring arms.

As the vehicle 10 proceeds along its predetermined path as defined by the road bed elements 14, the collector brush 56 engages the first conductor element 30 while the collector brush 58 engages the second conductor element 32. The third collector brush 60 is in engagement with the inwardly facing surface 36 of the third conductor element 34. The third conductor element is the ground terminal and, therefore, no insulation need be provided. The aligning wheel 44, as it contacts and moves along the inwardly facing surface 36 of the third conductor 34 keeps the array of spring arms and collector brushes in proper, aligned position with respect to the various conductors. In this aligned position, the collector brushes may move along the respective conductor elements to pick up the power required to propel the vehicle along its path of travel. The various spring arms are suitably wired so that they may be connected to the electrical motors which propel the vehicle along its track.

There has been disclosed herein a power supply system for a vehicle which is guided along a predetermined path. The invention will have many modifications apparent to those skilled in the art upon a reading of this specification. It is intended that all modifications which fall within the true spirit and scope of this invention be included within the scope of the appended claims.

We claim:

1. A power supply system for a vehicle which is guided along a predetermined path, which power supply system comprises:

a support structure mounted along and generally facing inwardly toward said predetermined path of said vehicle;

first and second insulating members secured to said support structure;

first and second conductor elements respectively mounted along the portions of said first and second insulating members which face inwardly toward said predetermined vehicle path;

a third conductor element secured to said support structure and providing a relatively smooth surface facing inwardly toward said predetermined vehicle path;

an aligning wheel;

first structure means including a support member for rotatably supporting said aligning wheel from said vehicle in such a horizontal position that said wheel engages said smooth surface of said third conductor element;

a support structure secured to said support member of said first structure means and extending down a portion of the length of said vehicle path away from said aligning wheel, said support structure including electrically insulated portions;

three spring arms extending from said insulated portions of said support structure down a portion of the length of said vehicle path away from said aligning wheel, each of said fingers being in juxtaposition to one of said conductor elements and having free ends flexed toward engagement with an associated conductor element;

three collector brushes; and means for securing said collector brushes to said free ends of individual ones of said spring arms in facing relationship with an associated conductor element.

2. The power supply system of claim 1 wherein: said first and said second conductor elements are secured to the upper portion of said support structure, and wherein: said third conductor elements is secured to the lower portion of said support structure.

3. The power supply system of claim 2 wherein: said third conductor element is an "I" beam member with its top surface facing inwardly toward said vehicle path.

* * * * *